(12) United States Patent
Achtermann et al.

(10) Patent No.: US 10,949,939 B2
(45) Date of Patent: *Mar. 16, 2021

(54) TRACKING PRODUCTS WITH CHAIN OF CUSTODY USING IOT DEVICES

(71) Applicant: International Business Machines Corporation, Armonk, NY (US)

(72) Inventors: Jeffrey M. Achtermann, Austin, TX (US); Rahul Gupta, Austin, TX (US); Arnaud A. Mathieu, Austin, TX (US); Maharaj Mukherjee, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/194,131

(22) Filed: Nov. 16, 2018

(65) Prior Publication Data

US 2019/0102855 A1 Apr. 4, 2019

Related U.S. Application Data

(63) Continuation of application No. 15/490,456, filed on Apr. 18, 2017.

(51) Int. Cl.
*G06Q 50/22* (2018.01)
*G06Q 10/06* (2012.01)

(52) U.S. Cl.
CPC ......... *G06Q 50/22* (2013.01); *G06Q 10/0633* (2013.01)

(58) Field of Classification Search
CPC . G06Q 50/22; G06Q 10/0633; G07C 9/00087
USPC .......................................................... 705/28
See application file for complete search history.

(56) References Cited

U.S. PATENT DOCUMENTS

| 3,685,188 | A | * | 8/1972 | Syversen | ............ B60R 13/105 40/201 |
|---|---|---|---|---|---|
| 9,436,853 | B1 | | 9/2016 | Meyers | |
| 9,456,302 | B2 | | 9/2016 | Skomra et al. | |
| 9,752,840 | B1 | * | 9/2017 | Betro | ................... H04W 4/029 |

(Continued)

FOREIGN PATENT DOCUMENTS

| WO | 2006007505 A2 | 1/2006 |
|---|---|---|
| WO | 2007149928 A2 | 12/2007 |
| WO | 2014177934 A2 | 11/2014 |

OTHER PUBLICATIONS

U.S. Appl. No. 15/490,456—Tracking Products with a Chain of Custody Using IoT Devices (Parent) (filed 2019).*

(Continued)

*Primary Examiner* — Florian M Zeender
*Assistant Examiner* — Nicole Elena Bruner
(74) *Attorney, Agent, or Firm* — Mollborn Patents, Inc.; Frederik Mollborn

(57) ABSTRACT

Methods for chain of custody tracking for an object are described. Several sets of Internet of Things (IoT) sensors are organized in a network. Each set of sensors is configured to record one or more events relating to the object. Each event includes an event time, an event location, and an entity that is a custodian for the object at the time of the event. When the object changes custodians, proper custodianship is verified based on input from at least one set of IoT sensors.

5 Claims, 2 Drawing Sheets

(56) References Cited

U.S. PATENT DOCUMENTS

| | | |
|---|---|---|
| 2003/0183683 A1 | 10/2003 | Stewart |
| 2006/0004524 A1 | 1/2006 | Aucoin et al. |
| 2006/0106718 A1 | 5/2006 | Spellman et al. |
| 2006/0277061 A1 | 12/2006 | Revanur et al. |
| 2015/0278757 A1* | 10/2015 | Walden ................ C07D 311/80 235/376 |
| 2016/0234633 A1* | 8/2016 | Huang .................... H04W 4/02 |
| 2017/0178072 A1* | 6/2017 | Poornachandran .......................... G06Q 20/3227 |

OTHER PUBLICATIONS

Prat, YJ. et al.; "Accessing IoT Sensor Data from Multiple Locations"; http://ip.com/IPCOM/000246617D; Jun. 21, 2016. 7 pp.
Sarbin, B. et al.; "Point to Select Interface for Connected Object Control"; http://ip.com/IPCOM/000239649D; Nov. 21, 2014. 12 pp.
Tulchinsky, I. et al; "RealWorld Products in Virtual Environments"; http://ip.com/IPCOM/000229273D; Jul. 17, 2013. 18 pp.

\* cited by examiner

TRACKING PRODUCTS WITH CHAIN OF CUSTODY USING IOT DEVICES

BACKGROUND

The present invention relates to tracking products, and more specifically, to tracking products with chain of custody, using Internet of Things devices. Chain of custody (CoC), in the contexts of food and drug items, refers to the chronological documentation showing the seizure, custody, control, transfer, analysis, and disposition of those items. CoC is very important when something goes wrong, for example, when a food or drug is contaminated and food borne diseases impact the population. CoC is equally important for medical samples, such as blood, urine etc., to ensure they have not been contaminated or tampered with when moved from point A to point B.

The Internet of Things (IoT) is the internetworking of physical devices, vehicles, buildings, and other items embedded with electronics, software, sensors, actuators, and network connectivity that enable these devices to collect and exchange data. The IoT allows objects to be sensed and/or controlled remotely across existing network infrastructure, creating opportunities for more direct integration of the physical world into computer-based systems, and resulting in improved efficiency, accuracy and economic benefit in addition to reduced human intervention.

"Things," in the IoT sense, can refer to a wide variety of devices such as heart monitoring implants, biochip transponders on farm animals, electric clams in coastal waters, automobiles with built-in sensors, DNA analysis devices for environmental/food/pathogen monitoring or field operation devices that assist firefighters in search and rescue operations. These devices collect useful data with the help of various existing technologies and then autonomously flow the data between other devices.

SUMMARY

According to one embodiment of the present invention, methods are provided for chain of custody tracking for an object. Several sets of Internet of Things (IoT) sensors are organized in a network. Each set of sensors is configured to record one or more events relating to the object. Each event includes an event time, an event location, and an entity that is a custodian for the object at the time of the event. When the object changes custodians, proper custodianship is verified based on input from at least one set of IoT sensors. If the verification fails, a number of different actions may be taken, as will be described in further detail below.

The details of one or more embodiments of the invention are set forth in the accompanying drawings and the description below. Other features and advantages of the invention will be apparent from the description and drawings, and from the claims.

BRIEF DESCRIPTION OF THE DRAWINGS

Like reference symbols in the various drawings indicate like elements.

DETAILED DESCRIPTION

The various embodiments of the invention pertain to techniques for CoC tracking for an object, using IoT sensors. The various embodiments described herein can be applied for physical objects, such as food or medical products or samples, as well as virtual objects such as emails, e-documents, Intellectual Property (e.g., trade secrets), confidential materials, and so on. The CoC is defined in a systematic workflow plan (i.e., an organized sequence of tasks), which is typically created and associated with the object when the object is created or when the object is received at the front end of the CoC.

As the object moves through the CoC, IoT sensors organized in networks automatically track and verify proper custodianship of the object in terms of "who," "when," and "where," whenever an event for the object is recorded by the IoT sensors, to ensure that the custodianship of the object is in compliance with a workflow plan that has been established for the object. If any discrepancies are discovered, a variety of actions can be taken, as will be described below. With reference now to the drawings, a number of embodiments of the invention will be described by way of example.

Example 1

In a first embodiment, IoT sensors are organized in an object ownership/custodian relationship. IoT sensors that are associated with an owner/custodian communicate with IoT sensors that are associated with the object, and the relationship is established through the communication channels between the IoT sensors. Information can be exchanged between the IoT sensors, for example, using the Internet protocol (IP).

Figure 1:
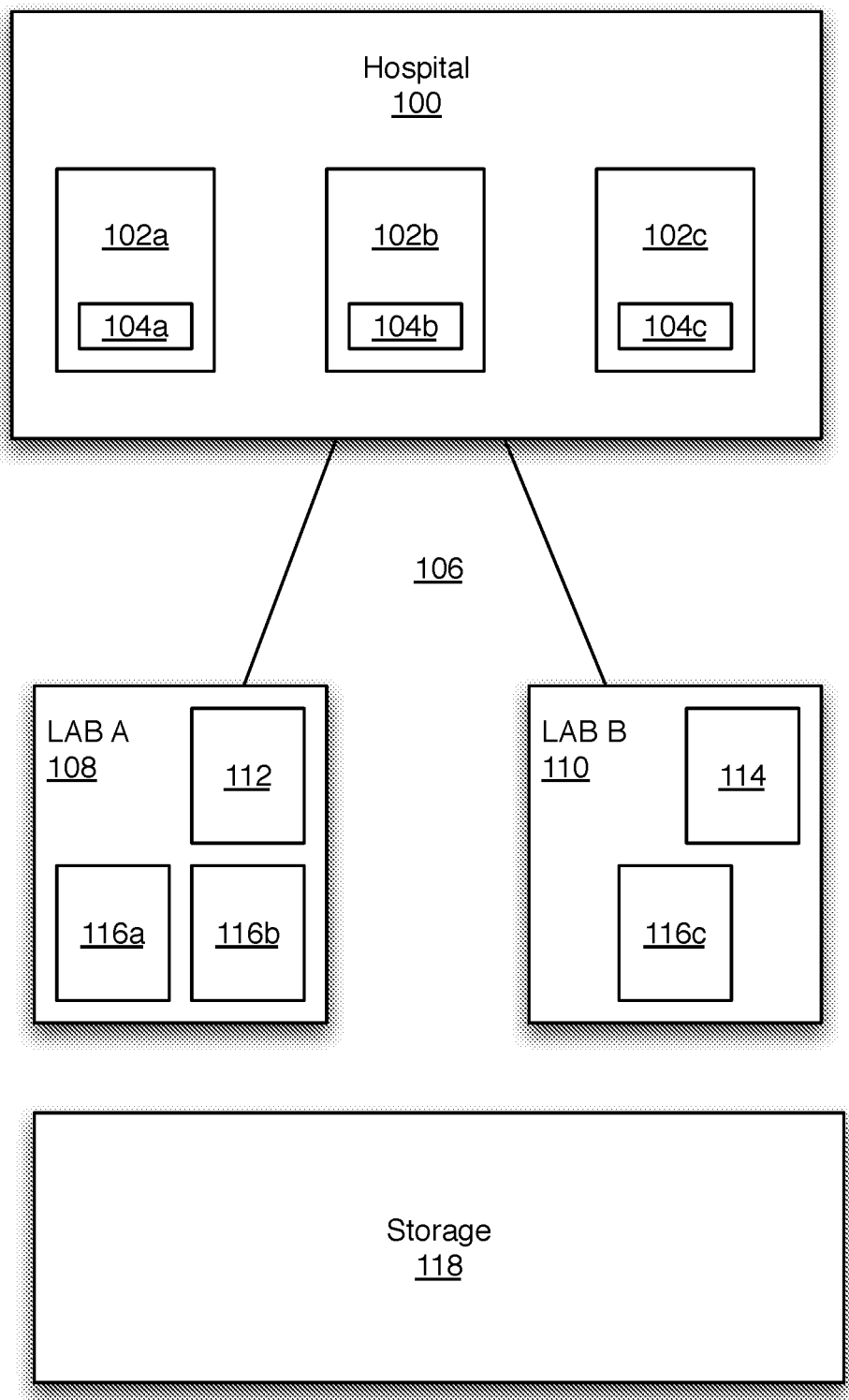
FIG. 1 shows an example of how an object is transferred through a CoC, in accordance with one embodiment.

For example, with reference to FIG. 1, in a patient sample collection system in a hospital 100, several collection specialists work at different collection stations 102a-c to collect samples 104a-c from each patient. Immediately after the samples 104a-c are collected, the ownership is associated with the collection specialists. Next the samples 104a-c are transferred via a transportation system 106 to different laboratories 108 and 110. At that moment, the ownership is instead associated with the transportation system 106. After reaching the laboratories 108, 110, the ownership is associated with the receiving stations 112, 114. Further, when samples 104a-c are distributed to separate lab testing stations 116a-c, for example, depending on the sample type, the ownership is transferred to the lab testing stations 116a-c. Finally, when the samples 104a-c are sent to storage, the ownership is transferred to the storage. At each step of this CoC, the IoT devices record the ownership transfer and the recorded information is stored for future use.

In one embodiment, at each stage of the object ownership and custody, a group of IoT sensors verifies, based on a multi-level authentication, that the object is under control by a proper owner or custodian. Multi-level authentication in this context means authentication based on several levels, for example, based on security or other requirements, such as protocols. Some examples of multi-level authentication include, for example, PIN codes, passwords, biometric, or remote authentication and confirmation. The system can also confirm with the proper workflow plans. For example, a storage system cannot become a custodian before the lab testing station, and so on.

If the custodianship is not verifiable or cannot be authenticated at any point in the CoC, this irregularity is logged in a central system (or in a cloud computing environment) and an appropriate authority, for example, a system administrator or someone up in the custodian chain, is notified about the irregularity and/or asked to take an appropriate action.

When an object changes hand from one custodian to another—a proper tripartite handshake takes place among the object, the prior custodian and the new custodian to ensure that the ownership is updated for all features, attributes and aspects of the object. In one embodiment, the hand-over from one custodian to the next one is done by passing a token. For example, at any given time there can be a single copy of the token, which contains the identity of the current custodian. The token can either be associated with or be centrally stored at a supervisory device or computer, or both. The token can be used where the object is a "soft object," such as a file stored in a computer. In some embodiments, the token can ensure that the custodian may only keep the soft object for a certain time, or prevent the custodian from making any additional copies of the soft object.

In the context of a sample, some examples of attributes include: patient name or ID, collection dates and time etc. Features include, for example, the kind of sample (blood, urine, etc.). Aspects include other important items, for example, what system was used to collect the sample, the time the sample will be transferred to the next station in the CoC, and so on.

Example 2

In a second embodiment of the invention, the object comes in a locked environment. The "locked environment" can be either a physical lock for a physical object, which cannot be accessed without a proper key or other unlocking mechanism. In the context of a virtual object, the lock can be, for example, an encryption key. In both situations, the locked object can only be opened when a proper custodian is ready to accept the object and is a holder of the proper key for opening the lock.

Example 3

In a third embodiment of the invention, a virtual or physical object can self-destruct if intrusion or tampering with the object is suspected, and proper custody cannot be established after several attempts. For example, there may be situations in which it is better to destroy certain information (e.g., social security numbers, credit card numbers, medical records, etc.), and possibly restore it later, rather than having the information get into the wrong hands.

Example 4

In a fourth embodiment of the invention, a virtual or physical object locks itself with a more secure key or higher order of encryption if the object suspects intrusion or tampering and a proper custody cannot be established after several attempts. This is similar to what was described in Example 3 above. The more secure key for unlocking the object can be owned, for example, by someone higher in the authority chain.

Figure 2:
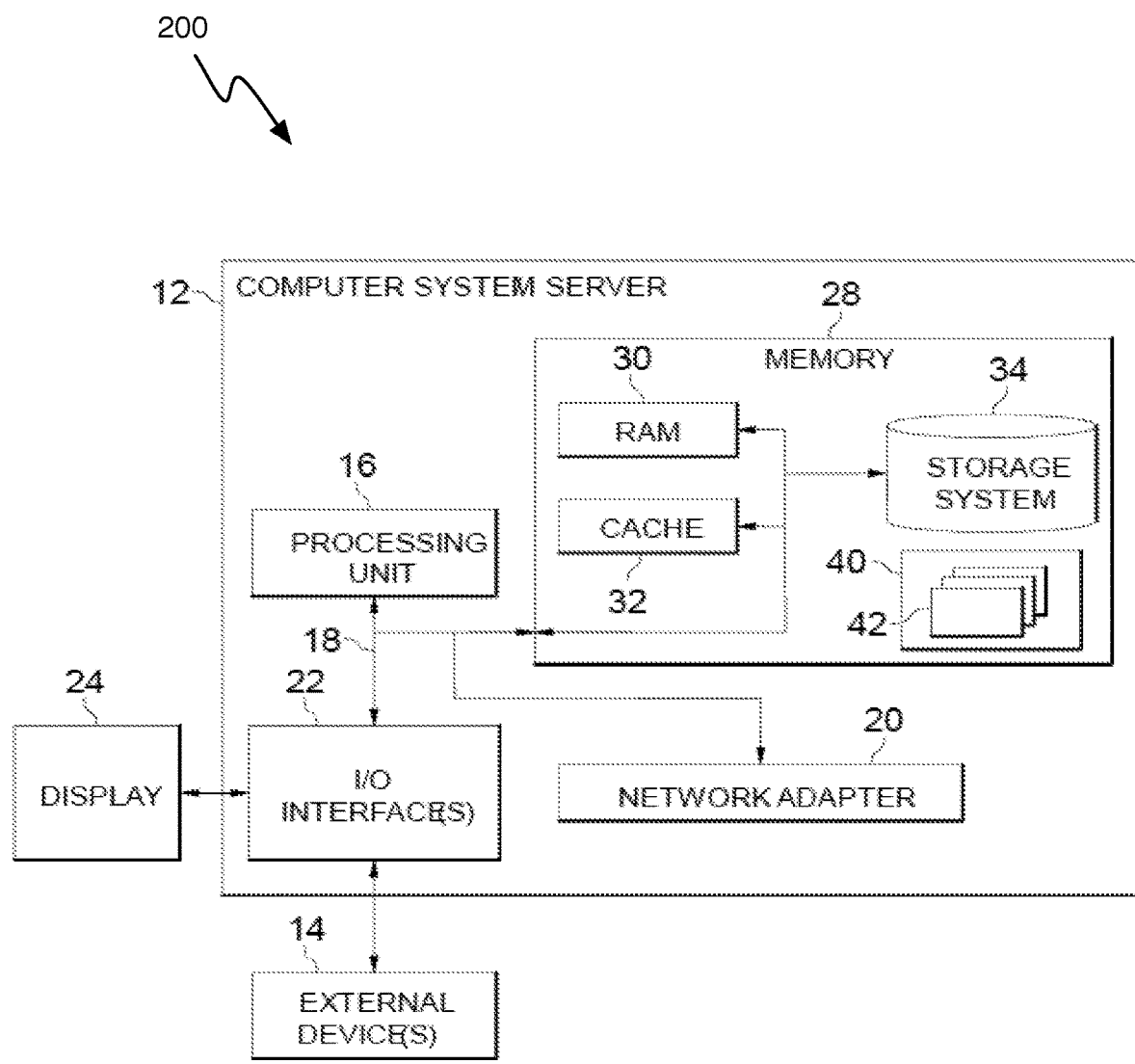
FIG. 2 shows a schematic view of a computer system for chain of custody tracking for an object, in accordance with one embodiment.

FIG. 2 shows a schematic view of a computer system in which various embodiments of the present invention can be implemented. As shown in FIG. 2, the computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system/server 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, and redundant processing units.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for automatic chain of custody tracking for an object while transferring the object from a first location to a second location, comprising:

organizing a plurality of sets of Internet of Things (IoT) sensors in a network, wherein a first set of IoT sensors is associated with the object and a second set of IoT sensors is associated with a custodian, and where the sets of IoT sensors are configured to record one or more events relating to the object, each event including an event time, an event location, and an entity that is a custodian for the object at the time of the event;

automatically exchanging information between the first and second sets of IoT sensors to verify proper custodianship through performing a multi-level authentication based on information received from at least one set of IoT sensors, and through performing a compliance check with a workflow plan for the object based on information received from the at least one set of IoT sensors, wherein the information between the first and second sets of IoT sensors is exchanged using the Internet Protocol;

in response to proper custodianship not being verifiable, logging an irregularity in a central system and providing a notification to an appropriate authority; and in response to the object changing custodians, performing a handshake between an IoT sensor associated with a current custodian of the object and a an IoT sensor associated with a new custodian of the object, including passing a token uniquely identifying the object from the IoT sensor associated with current custodian to the IoT sensor associated with new custodian, wherein information between the IoT sensors is exchanged using the Internet Protocol.

2. The method of claim 1, wherein the object is one of: a physical object, and a virtual object.

3. The method of claim 1, further comprising:

in response to the object changing custodians, ensuring that the new custodianship is updated for all features, attributes and aspects of the object.

4. The method of claim 1, wherein the object is in a locked environment and can only be opened by a custodian having a proper key for unlocking the object.

5. The method of claim 1, further comprising:

in response to being unable to verify proper custodianship, performing one or more of the following actions: locking the object, self-destructing the object, and locking the object with a more secure key than a current key.

* * * * *